(12) United States Patent
Verelst et al.

(10) Patent No.: US 7,603,741 B2
(45) Date of Patent: Oct. 20, 2009

(54) WIPER LEVER WITH A DRIVEN WIPER ARM AND A WIPER BLADE LINKED TO IT FOR CLEANING THE WINDOWS OF MOTOR VEHICLES IN PARTICULAR

(75) Inventors: Hubert Verelst, Tienen (BE); Eric Windmolders, Kermt (BE); Christian Wilms, Beringen (BE); Hans Beelen, Herk de Stad (BE); Robert Vertongen, Sinterueiten (BE)

(73) Assignee: Robert Bosch GmbH (DE)

( * ) Notice: Subject to any disclaimer, the term of this patent is extended or adjusted under 35 U.S.C. 154(b) by 681 days.

(21) Appl. No.: 10/520,346

(22) PCT Filed: Mar. 28, 2003

(86) PCT No.: PCT/DE03/01033

§ 371 (c)(1), (2), (4) Date: Jan. 5, 2005

(87) PCT Pub. No.: WO03/084791

PCT Pub. Date: Oct. 16, 2003

(65) Prior Publication Data

US 2005/0262653 A1 Dec. 1, 2005

(30) Foreign Application Priority Data

Apr. 4, 2002 (DE) ................. 102 14 956
Jul. 23, 2002 (DE) ................. 102 33 531
Aug. 8, 2002 (DE) ................. 102 36 385
Sep. 19, 2002 (DE) ................. 102 43 662
Dec. 12, 2002 (DE) ................. 102 57 991

(51) Int. Cl.
*B60S 1/40* (2006.01)
*B60S 1/38* (2006.01)

(52) U.S. Cl. ............... 15/250.201; 15/250.32; 15/250.43

(58) Field of Classification Search .......... 15/250.32, 15/250.43, 250.44, 205.201, 250.361, 250.351
See application file for complete search history.

(56) References Cited

U.S. PATENT DOCUMENTS

| 6,266,843 B1 * | 7/2001 | Doman et al. ........... 15/250.201 |
| 6,305,066 B1 * | 10/2001 | De Paoli et al. ................. 29/450 |
| 7,293,321 B2 * | 11/2007 | Breesch .................. 15/250.201 |
| 7,523,520 B2 * | 4/2009 | Breesch .................. 15/250.201 |

FOREIGN PATENT DOCUMENTS

| DE | 1 247 161 | | 8/1967 |
| DE | 3222864 | * | 12/1983 |
| DE | 37 09 810 | | 10/1988 |
| DE | 198 60 644 | | 7/2000 |
| EP | 0316114 | * | 5/1989 |
| WO | WO 02/40329 | | 3/2002 |

* cited by examiner

Primary Examiner—Gary K Graham
(74) Attorney, Agent, or Firm—Michael Best & Friedrich LLP

(57) ABSTRACT

The invention relates to a wiper lever (10) with a driven wiper arm (12) and a wiper blade (16) linked to it to clean windows, in particular of motor vehicles, which is provided with a band-like, long-stretched-out, elastic supporting element (30) that is curved over its band surfaces, which features a long-stretched-out, rubber elastic wiper strip (24) on its concave curved band surface (31), on whose upper, convex curved band surface (29), in particular in the longitudinal mid-range of the supporting element, a coupling part (32) sits to connect the wiper blade (16) to the wiper arm (12) and wind deflector strip sections (52) extending towards the ends of the supporting element are arranged in particular on both sides of the coupling part and a cap (60) to cover the connecting area between the wiper blade and the wiper arm belongs to the wiper lever, which cap can be locked on the supporting element (30) of the wiper blade and is provided with elastically deflectable locking means (74). Assembly of the cap on the wiper blade in its correct position on the wiper blade is achieved in a simple manner if the supporting element is provided with at least two limit stops (82) each pointing in opposite longitudinal directions of the wiper blade (16) to which corresponding counter limit stops (84) of the cap (60) are assigned.

16 Claims, 3 Drawing Sheets

WIPER LEVER WITH A DRIVEN WIPER ARM AND A WIPER BLADE LINKED TO IT FOR CLEANING THE WINDOWS OF MOTOR VEHICLES IN PARTICULAR

BACKGROUND OF THE INVENTION

In the case of a known wiper lever, the supporting element of the wiper blade is supposed to guarantee the most uniform possible distribution of wiper blade application force originating from the wiper arm on the window over the entire wiper field being covered by the wiper blade. Because of a corresponding curvature of the unstressed supporting element—i.e., when the wiper blade is not adjacent to the window—the ends of the wiper strip that are applied completely to the window during wiper blade operation are stressed by the then tensioned supporting element on the window, even if the curvature radii of spherically curved vehicle windows change with every wiper blade position. The curvature of the wiper blade must therefore be somewhat greater than the greatest curvature measured in the wiper field on the to-be-wiped window. The supporting element thereby replaces the expensive supporting bracket design, which is required to distribute the application force, with two spring rails arranged in the wiper strip, which are used for transverse reinforcement of the rubber elastic wiper strip, as is the practice with conventional wiper blades (German Printed Specification 1247 161).

In a known wiper lever in accordance with the species of PCT/DE01/04307 the cap covering the articulated connection between the wiper arm and the wiper blade is locked exclusively by friction with the wiper blade. A special fixation of the cap in the longitudinal direction of the wiper blade is not provided. In order to keep the assembly time of the cap on the wiper blade—including the required determination of position—as short as possible, the dimension of the passage opening in the longitudinal direction of the wiper blade must be provided with a high plus tolerance so that the required smooth-running oscillating movement between the wiper arm and the wiper blade is not impaired. The gaps thereby yielded between wiper arm and the edge of the passage opening in the cap lead to undesired air stream noise and also interfere with the harmonic transition between wiper blade and wiper arm in the area of the articulated connection that is striven for with the arrangement of the cap.

SUMMARY OF THE INVENTION

In the case of the wiper lever of the invention, the assembly of the cap on the wiper blade is simplified considerably, because the correct position of the cap is automatically defined due to the arrangement of at least two limit stops pointing in opposite longitudinal directions of the wiper blade, if the cap is provided with correspondingly embodied counter limit stops that cooperate with the limit stops on the wiper blade. The tolerance for the longitudinal dimension of the passage opening can be minimized as a result so that disadvantages can no longer be expected due to the now slight gap dimension between the wiper arm and the edge of the passage opening.

Particularly simple and cost-effective counter limit stops for the cap are produced if these are embodied on the already existing locking noses of the cap.

If a component to connect the wiper blade to the wiper arm is a part of the supporting element and sits on the supporting element's convex curved band surface, the limit stops of the supporting element can be embodied directly on this component so that the arrangement of special limit stops can be dispensed with.

With respect to simplified assembly of the wiper blade, the component grips around the longitudinal edges of the supporting element with holding claws, wherein the limit stops are embodied on the holding claws.

In order to keep the component and therefore also the cap compact, the component has two holding claws located at a distance from one another in the longitudinal direction of the wiper blade, whose facing cheeks form the limit stops for the locking noses of the cap that are located between the holding claws.

In the case of an embodiment—that is expedient in certain application cases—of the supporting element with two spring rails that are arranged at a distance from one another and are parallel in a common plane, their opposite, outer longitudinal edges are gripped by the holding claws of the component, which are provided with the limit stops of the supporting element. Also in this case, the limit stops of the supporting elements are expediently embodied on the holding claws of the component.

It is especially advantageous if the cap is manufactured of an elastic plastic so that the locking noses formed on the cap, supported by a corresponding shape, can be deflected elastically.

Additional advantageous developments and embodiments of the invention are disclosed in the following description of an exemplary embodiment depicted in the associated drawings.

DETAILED DESCRIPTION

Figure 1:
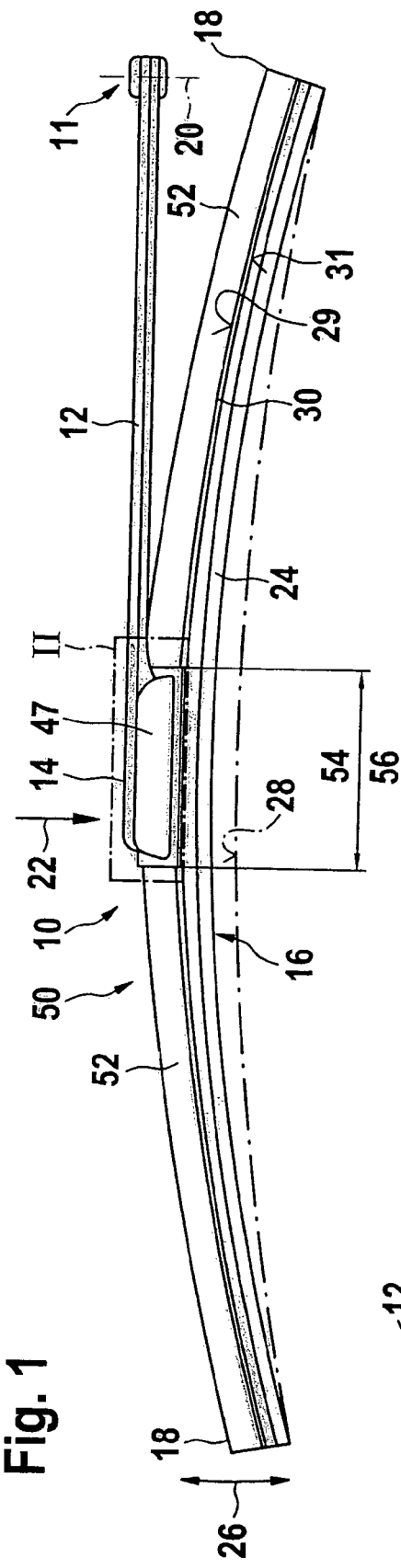
FIG. 1 A side view (not to scale) of a wiper lever, whose wiper blade is provided with a wind defector strip.

A driven wiper arm 12 that is guided on one end on a motor vehicle (not shown) is a part of the wiper lever 10 (FIG. 1) in accordance with the invention. The driven end of the wiper arm is provided with reference number 11 in FIG. 1. Linked to the other, free end 14 of the wiper arm is a long-stretched-out wiper blade 16 that belongs to the wiper lever 10. The wiper arm 12 is positioned on its drive end 11 in such a way that, during wiper operation, it can swing back and forth between reverse positions around a pendulum axis 20 in a vertical plane on the drawing plane. In the process, the wiper blade 16 is moved transverse to its longitudinal extension over the to-be-wiped window, whereby it abuts the surface 28 of a to-be-wiped window with a rubber elastic wiper strip 24.

Figure 3:
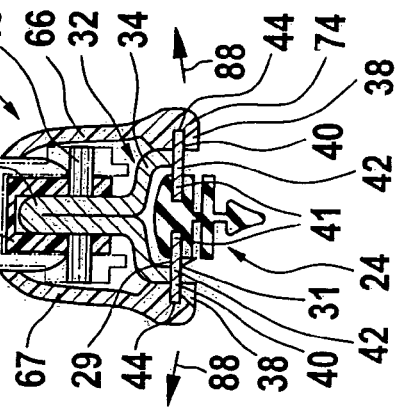
FIG. 3 A cross-section through the arrangement according to FIG. 2 cut along Line III-III.
Figure 2:
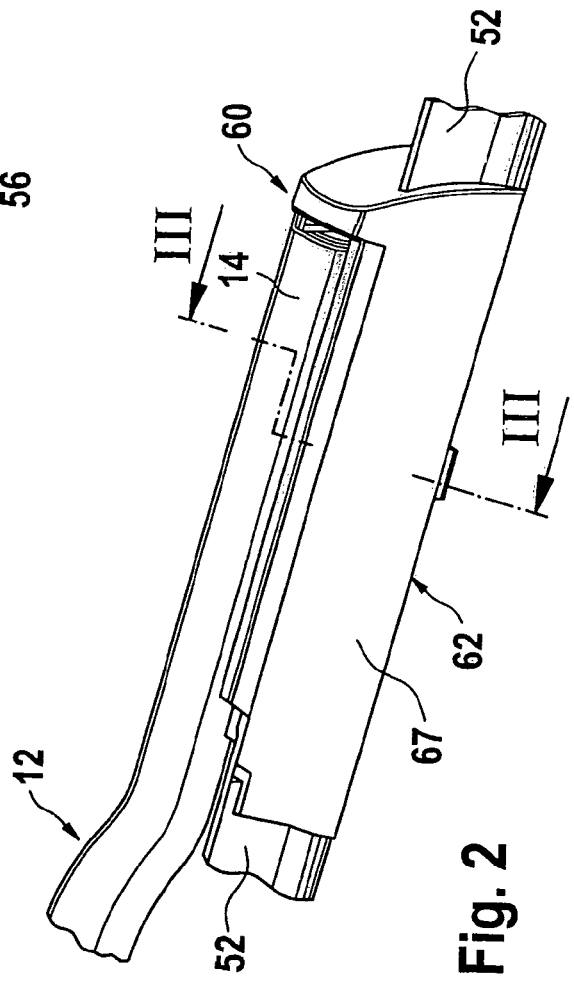
FIG. 2 An enlarged depiction of a detail designated by II in FIG. 1 in a perspective representation.
Figure 4:
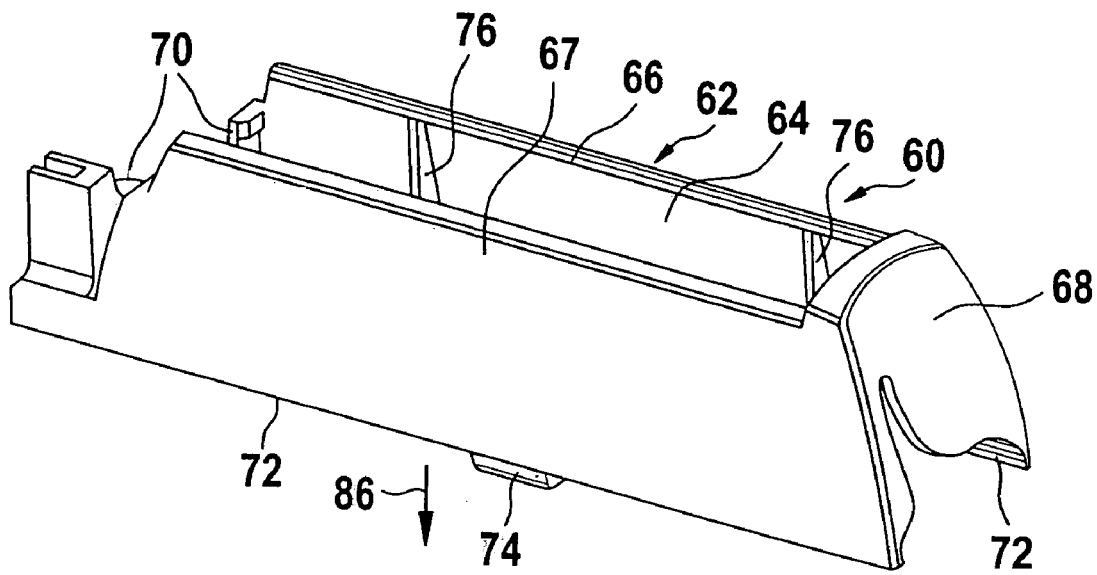
FIG. 4 A cap belonging to the wiper lever as seen from above and in a perspective representation.
Figure 5:
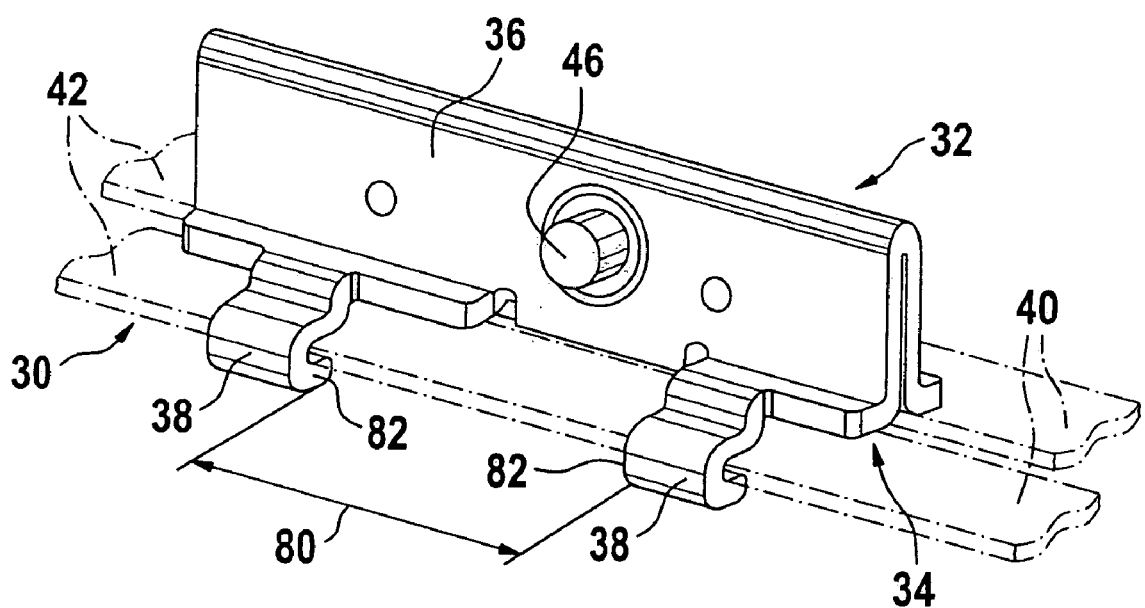
FIG. 5 A perspective view of a component belonging to the wiper blade and its arrangement on a supporting element of the wiper blade that is indicated by a dot-dash line.
Figure 6:
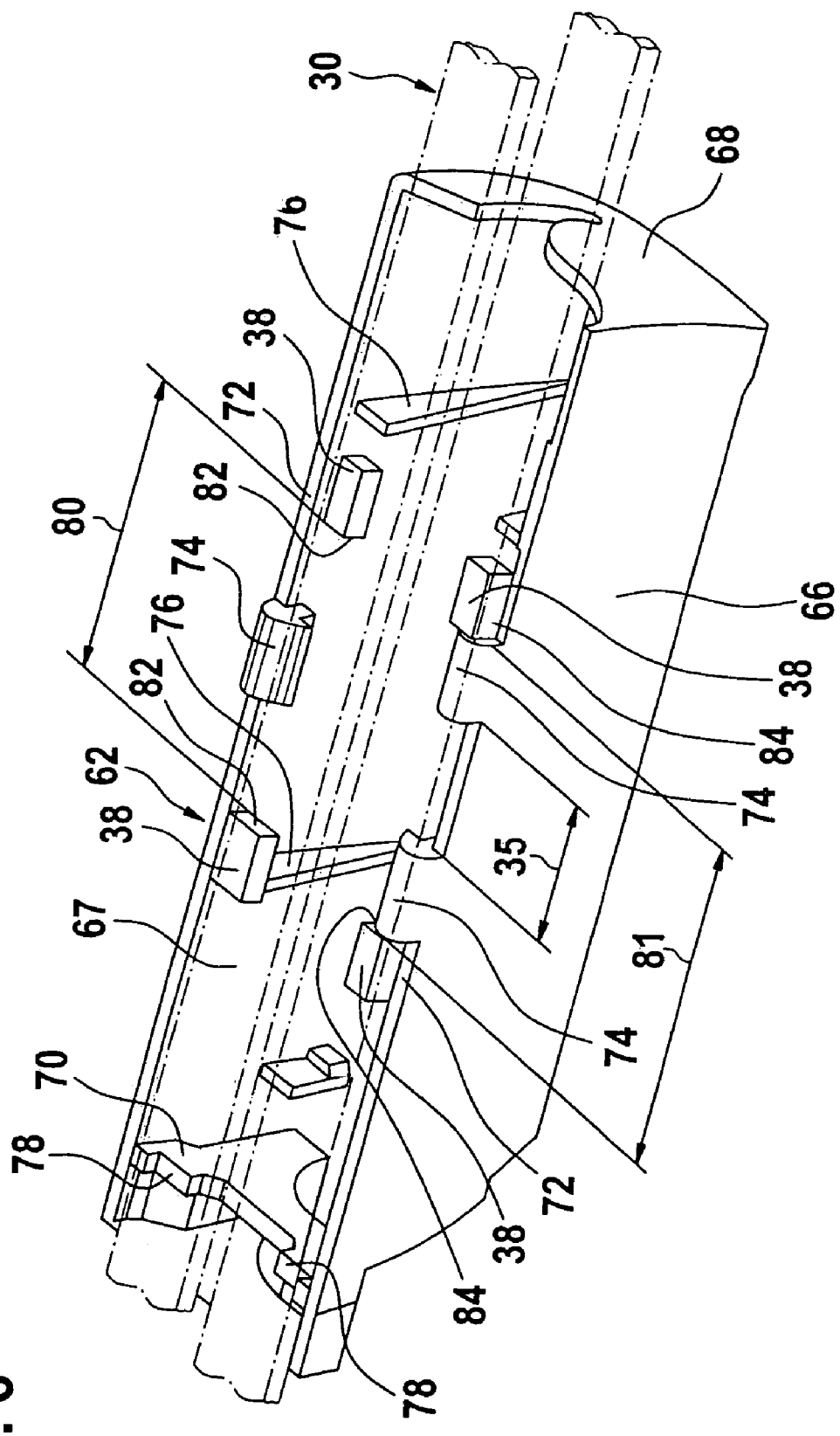
FIG. 6 A perspective representation (not to scale) of the cap according to FIG. 4 as seen from below with an arrangement (indicated by a dot-dash line) of a supporting element that features two springs rails as well as with the end pieces of holding claws of the component according to FIG. 5.

The wiper strip 24 is longitudinally axially parallel with a band-like, long-stretched-out, elastic supporting element 30, on whose upper band surface 29 facing away from the window a component 32 sits (FIGS. 3 and 5) via which the wiper blade 16 is connected to the wiper arm 12 in an articulated manner to form the wiper lever 10. The wiper strip 24 is therefore arranged on the lower band surface 31 of the supporting element 30 that faces the window. The component 32 whose cross-section is T-shaped in sections, and can also be designated as an articulated part, faces the supporting element 30 with its T-head 34 and grips around the outer longitudinal strips 40 of the supporting element 30 with claws 38 that are arranged on the T-head. The articulated part 32 is solidly connected to the supporting element 30 at these claws, for example, welded and/or fixed to it by squeezing the claws together. In the exemplary embodiment, the supporting element 30 includes two spring rails 42, which extend at least almost parallel to one other lying in a common plane. The supporting element is curved (FIG. 1) over its band surfaces 29, 31 in such a way that the wiper strip 24 is situated on its concave curved band surface 31 and the articulated part 32 sits on the convex curved band surface 29 (FIG. 1). The inner facing longitudinal strips 41 of the spring rails 42 lie in open-edged longitudinal grooves 44 of the wiper strip 24. The T-foot 36 of the coupling part 32 extends away from the supporting element 30 and is penetrated by an articulated bolt 46, whose two ends projecting out of the T-foot are visible in FIGS. 3 and 5. The wiper arm 12 (shown in a dot-dash line in FIG. 3) engages at this articulated bolt or rather at its open ends with correspondingly embodied rest recesses. An adapter 48 that is preferably manufactured of a plastic is located between the T-foot 36 and the wiper arm 12 and this adapter guarantees an operationally reliable, detachable connection is between the wiper arm 12 and the wiper blade 16 that forms the wiper level 10. FIG. 3 shows that the articulated bolt 46 or rather its articulated axis 47 essentially extends in the direction of the pendulum motion or operating motion of the wiper lever 10. As FIG. 1 shows, the to-be-wiped surface 28 of the window is curved. Since the line 28 is supposed to represent the greatest curvature of the window surface, it is clearly evident that the curvature of the as yet unstressed wiper blade 16, whose two ends 18 are adjacent to the window surface 28, is greater than the maximum curvature of the window. Under an application force exerted by the wiper arm 12 acting in the direction of arrow 22 (FIG. 1), the wiper blade applies its rubber elastic wiper strip 24, arranged on the lower band surface 31 of the supporting element, over the entire length of the window surface 28. In doing so, tension builds up in the elastic supporting element 30 manufactured of metal and this tension is responsible for the proper application of the wiper strip 24 over its entire length on the window as well as for the uniform distribution of the application force 22. Moreover, the supporting element 30 with its spring rails 42 is responsible for the required transverse stabilization of the rubber elastic wiper strip 24. Because the window, which is spherically curved as a rule, does not represent a section of a spherical surface, the wiper blade 16 must be able to constantly adapt vis-à-vis the wiper arm 12 during its wiper operation to the respective position and the progression of the window surface 28. As a result, a smooth-running articulated connection is required between the wiper arm 12 and the wiper blade 16 that makes an oscillating movement (double arrow 26 in FIG. 1) around the pivot pin axis 47 possible. In addition, FIGS. 1 and 4 show that the articulated axis 47 is also aligned transverse to the direction of the application force (arrow 22). FIGS. 1 and 2 show that the wiper blade is provided on the upper band surface 29 of the supporting element 30 with a wind deflector strip 50 that is connected for example with the wiper strip 24. The wind deflector strip has two partial sections 52 that lie at a distance 54 from one another as seen in the longitudinal direction of the wiper blade (FIG. 1). This results therefore in a free space 56 in the wind deflector strip 50, which makes the arrangement of the articulated part 32 on the supporting element 30 possible. The wind deflector strip 50 is provided with an air-flow flute on its one longitudinal side against which mainly the air stream flows. In order to cover the articulated connection between the wiper arm 10 and the wiper blade 12 or rather between its articulated part 32 and to achieve a harmonic transition between the facing ends of the partial sections 52 of the wind deflector strip 50, a cap 60 is also part of the wiper lever 10 and its structure is supposed to be explained particularly on the basis of FIGS. 3, 4 and 6. It has a trough-shaped center section 62, whose trough base is largely removed, thereby yielding a passage opening 64 for the free end 14 of the wiper arm. As a result, the cap has two longitudinal walls 66 and 67, which are connected to one another at their one end by an end wall 68 and at their other ends by a cross strut 70. The two longitudinal walls 66, 67 of the cap 60, which is manufactured of an elastic plastic, are provided with elastically deflectable locking means on their longitudinal edges 72 that face the supporting element 30, which are embodied as locking noses 74 in the exemplary embodiment. In this connection, two locking noses 74 located at a distance 35 from one another are arranged on the one longitudinal wall 66. Located on the longitudinal edge 72 of the other longitudinal wall 67 is a locking nose 74, which is located—as related to the two locking noses on the longitudinal wall 66—between the two locking noses 74 of the longitudinal wall 66. In addition, arranged on each longitudinal wall are supporting or reinforcing ribs 76, which extend essentially from the passage opening 64 until close to the longitudinal edges 72 of the longitudinal walls 66, 67. On the ends of the supporting ribs 76 facing the edges 72, they are recessed to match the width of the supporting element 30 so that supports 78 are produced (FIG. 6).

As already mentioned, the claws 38 of the articulated part 32 are arranged at a distance from one another as seen in the longitudinal direction so that an intermediate space 80 is yielded between the two claws that are located on the same side of the articulated part 32. The intermediate space 80 is therefore limited by facing cheek-like front sides 82 of the holding claws 38 (FIG. 5). This can also be seen in FIG. 6 where the ends of the claws 38 have been drawn in for the purpose of understanding the invention better. In order to achieve a simple, exact positioning of the cover 60 on the supporting element 30, the invention uses the facing front sides 82 of the holding claws 38 as positioning shoulders or positioning aids in the exemplary embodiment. These positioning shoulders or positioning aids define the proper assembly position of the cap on the supporting element 30 or rather on the wiper blade 16 in cooperation with the fore parts 84 of the locking noses 74 that are facing away from one another. This is possible as a result, because the articulated part 32—as already mentioned—is solidly connected with the supporting element 30 or rather with its spring rails 42. Therefore, the fore parts 84 of the locking noses 74 that are facing away from one another have a distance 81 from one another that has been adapted to match the dimension of the intermediate space 80 between the front sides or cheeks 82 of the holding claws 38. Therefore, the front sides 82 of the holding claws 38 form limit stops that point in two opposite longitudinal directions of the wiper blade, to which the fore parts 84 of the cap's locking noses 74 acting as counter limit stops are assigned as fitting shoulders.

It goes without saying that the arrangement of the locking noses shown in the exemplary embodiment represents only one of several possibilities for realizing the invention with respect to the holding claws. Of course, it is also possible to position the locking noses of the cap on the two front sides of the holding claws that are facing away from one another. Moreover, it is also conceivable to put at least two locking noses of the cap in a working connection with a single holding claw by arranging one locking nose each on both sides of such a holding claw. In addition, it is naturally also conceivable for several locking noses to be arranged on the longitudinal wall 67 instead of a single locking nose and these locking noses can also be used as positioning aids. It can also be meaningful to provide the cap 60 on its two longitudinal edges 72 with only one single locking nose, whose longitudinal extension is coordinated with the dimension of the intermediate space 80. Proper positioning of the cap on the supporting element or rather on the wiper blade is always achieved by this in that the supporting element has at least two limit stops each pointing in opposite longitudinal directions of the wiper blade, to which corresponding limit stops of the cap are assigned.

In order to attach the cap to the supporting element, the cap is put into a position with respect to the wiper blade, which is depicted in FIGS. 4 and 5. From this pre-assembly position, the cap 60 is placed on the wiper blade in the direction of arrow 86. During this placement motion, the locking noses 74 deflect due to their shape, for example the formation of starting bevels in the direction of arrow 88 in FIG. 3, when the starting bevels impact against the outer longitudinal strips 40 of the supporting element 30. This deflection can be achieved either by certain cross-section modifications of the locking noses known to the expert and/or by an elastic deflection of the longitudinal walls 66, 67 of the cap 60. The assembly motion (arrow 86) of the cap is concluded if the supports 78 are resting on the support ribs 76 on the upper band surface 29 of the supporting element 30. In this position the locking noses 74 can spring back into their initial position, because the outer longitudinal strips 40 of the supporting element 30 can reach into the rear sections of the locking noses, whereby the locking noses grip under the supporting element and thereby bring about a secure fit of the cap 60 on the wiper blade 16.

After the cap is connected to the wiper blade, further assembly of the wiper lever 10 can take place in that the free end 14 of the wiper arm 12 is fed through the passage opening 64 and the articulated connection between the wiper arm 12 and the wiper blade 16 is produced.

The invention claimed is:

1. Wiper lever with a driven wiper arm (12) and a wiper blade (16) linked to it to clean windows, which is provided with a band-like, long-stretched-out, elastic supporting element (30) that is curved over its band surfaces, which features a long-stretched-out, rubber elastic wiper strip (24) on its concave curved band surface (31) and a component (32) to connect the wiper blade (16) to the wiper arm (12) sits on its convex curved band surface (29), wherein a cap (60) to cover the connecting area between the wiper blade and the wiper arm belongs to the wiper lever (10), which cap can be locked on the supporting element (30) of the wiper blade (16) and is provided with elastically deflectable locking means (74), characterized in that the supporting element (30) is provided with at least two limit stops each pointing in opposite longitudinal directions of the wiper blade (16) to which corresponding counter limit stops of the cap (60) are assigned, characterized in that the component (32) to connect the wiper blade (16) to the wiper arm (12) is a part of the supporting element (30) and sits on the supporting element's convex curved band surface (29) and limit stops (82) of the supporting element are embodied on the component, characterized in that the component (32) grips around longitudinal edges (40) of the supporting element (30) with holding claws (38) and that the limit stops are embodied on holding claws of the component, and further characterized in that the component (32) has two holding claws (38) located at a distance (80) from one another in the longitudinal direction of the wiper blade, whose facing cheeks (82) form the limit stops for the locking means (74) of the cap (60) that are located between the holding claws.

2. Wiper lever according to claim 1, characterized in that the counter limit stops of the covering cap (60) are embodied on the locking means (74).

3. Wiper lever according to claim 1, characterized in that the component (32) is arranged in a longitudinal mid-range of the supporting element and wind deflector strip sections (52) extending towards the ends of the supporting element are arranged on both sides of the component.

4. Wiper lever according to claim 1, characterized in that the supporting element (30) features two spring rails (42) that are arranged at a distance from one another and are parallel in a common plane, whose opposite, outer longitudinal edges (40) are gripped by the holding claws (38) of the component (32), which are provided with the limit stops (82) of the supporting element.

5. Wiper lever according to claim 1, characterized in that the cap (60) is made of an elastic plastic.

6. Wiper lever with a driven wiper arm (12) and a wiper blade (16) linked to it to clean windows, which is provided with a band-like, long-stretched-out, elastic supporting element (30) that is curved over its band surfaces, which features a long-stretched-out, rubber elastic wiper strip (24) on its concave curved band surface (31) and a component (32) to connect the wiper blade (16) to the wiper arm (12) sits on its convex curved band surface (29), wherein a cap (60) to cover the connecting area between the wiper blade and the wiper arm belongs to the wiper lever (10), which cap can be locked on the supporting element (30) of the wiper blade (16) and is provided with elastically deflectable locking means (74), characterized in that the supporting element (30) is provided with at least two limit stops each pointing in opposite longitudinal directions of the wiper blade (16) to which corresponding counter limit stops of the cap (60) are assigned, characterized in that the component (32) to connect the wiper blade (16) to the wiper arm (12) is a part of the supporting element (30) and sits on the supporting element's convex curved band surface (29) and limit stops (82) of the supporting element are embodied on the component, characterized in that the component (32) grips around longitudinal edges (40) of the supporting element (30) with holding claws (38) and that the limit stops are embodied on holding claws of the component, and further characterized in that the supporting element (30) features two spring rails (42) that are arranged at a distance from one another and are parallel in a common plane, whose opposite, outer longitudinal edges (40) are gripped by the holding claws (38) of the component (32), which are provided with the limit stops (82) of the supporting element.

7. Wiper lever according to claim 6, characterized in that the cap (60) is made of an elastic plastic.

8. Wiper lever according to claim 6, characterized in that the counter limit stops of the covering cap (60) are embodied on the locking means (74).

9. Wiper lever according to claim 6, characterized in that the component (32) is arranged in a longitudinal mid-range of the supporting element and wind deflector strip sections (52) extending towards the ends of the supporting element are arranged on both sides of the component.

10. A wiper lever (10) comprising a driven wiper arm (12) and a wiper blade (16), which is connected to the wiper arm in an articulated manner, for cleaning windows, the wiper lever having a spring-elastic supporting element (30) which is elongate and has longitudinal sides, a convexly curved band surface (29), a concavely curved band surface (31) and an elongate, rubber-elastic wiper strip (24), and the supporting element having, on its convexly curved band surface (29), a component (32) for connecting the wiper blade (16) to the wiper arm (12), wherein the wiper lever (10) includes a cap (60) which has elastically deflectable latching lugs (74), the cap being configured to be latched to the supporting element (30) of the wiper blade (16) for covering the connection region between wiper blade and wiper arm, characterized in that the supporting element (30) is curved in the manner of a band and over its band surfaces, with the wiper strip (24) being fastened to the concavely curved band surface (31) and the component (32) being fastened to the convexly curved band surface (29), said component laterally surrounding the supporting element (30) on each longitudinal side by means of retaining claws (38) which are arranged at a distance (80) from each other in the longitudinal direction, and with at least two cheeks (82) which each face in mutually opposed longitudinal directions of the wiper blade (16) forming stops to which correspondingly assigned counter-stops of the covering cap (60) are adjacent.

11. Wiper lever (10) according to claim 10, characterized in that the counter-stops of the covering cap (60) are formed on the latching lugs (74).

12. Wiper lever (10) according to claim 11, characterized in that two mutually facing cheeks (82) of the retaining claws (38) form the stops for the latching lugs (74) of the covering cap (60), which latching lugs are located between the retaining claws (38).

13. Wiper lever (10) according to claim 11, characterized in that two adjacent latching lugs (74) enclose a retaining claw (38) with stops between them.

14. Wiper lever (10) according to claim 11, characterized in that one latching lug (74) extends in the longitudinal direction to an extent such that it fills the intermediate space (84) between the cheeks (82) of two adjacent retaining claws (38).

15. Wiper lever (10) according to claim 10, characterized in that the supporting element (30) has two spring rails (42) which are arranged at a distance from each other and such that they act in the same direction in a common plane and the mutually remote, outer longitudinal edges (40) of which are reached around by the retaining claws (38) of the component (32), the cheeks (82) of which retaining claws form stops for the cap (60).

16. Wiper lever (10) according to claim 10, characterized in that the component (32) is arranged in a longitudinal central region of the supporting element and wind-deflecting-strip sections (52) extending to the ends of the supporting element are arranged on both sides of the component.

* * * * *

UNITED STATES PATENT AND TRADEMARK OFFICE
CERTIFICATE OF CORRECTION

PATENT NO. : 7,603,741 B2
APPLICATION NO. : 10/520346
DATED : October 20, 2009
INVENTOR(S) : Verelst et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1165 days.

Signed and Sealed this

Fourteenth Day of December, 2010

David J. Kappos
*Director of the United States Patent and Trademark Office*